April 16, 1929. H. PEREIRA 1,709,806
AUTOMOBILE SIGNAL SWITCH
Filed Sept. 30, 1926  2 Sheets-Sheet 1

WITNESSES

INVENTOR
Honorino Pereira
BY
ATTORNEYS

April 16, 1929.    H. PEREIRA    1,709,806
AUTOMOBILE SIGNAL SWITCH
Filed Sept. 30, 1926    2 Sheets-Sheet 2

WITNESSES

INVENTOR
Honorino Pereira
BY
ATTORNEYS

Patented Apr. 16, 1929.

1,709,806

UNITED STATES PATENT OFFICE.

HONORINO PEREIRA, OF WEST NEW YORK, NEW JERSEY.

AUTOMOBILE SIGNAL SWITCH.

Application filed September 30, 1926. Serial No. 138,697.

The present invention in so far as it is concerned with an automobile signalling system relates to improved means for signalling right and left hand turns of an automotive vehicle. An object of the invention is to provide signalling mechanism which operates either an audible or visible signal or both whenever the driver of a car swings the wheel to the right or left, it being understood that minor movements of the wheel such as are necessary to keep a vehicle in a straight course do not affect the signalling mechanism.

In so far as the invention relates to a switch, I have provided a switch which may be adapted for a wide range of utility, but which finds its preferred embodiment in a device for operating a signalling system such as that disclosed above, in which the circuits for both visible and audible signals are to be closed by movement of a rotatable element to a predetermined extent.

An object of the invention is to provide a switch of the character above noted which will be of simple, practical construction, yet which will be rugged, durable and highly efficient in use.

Other objects of the invention are to provide a signalling switch and signal system which will in no way detract from the appearance of an automobile, and which will add no cumbersome mechanism to the instrument board, inasmuch as the switch itself is preferably concealed beneath the floor of the car and connected to the steering post.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Figure 1:
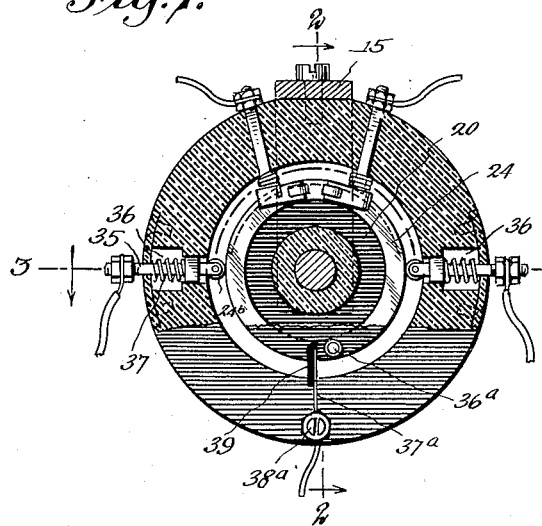
Fig. 1 is a view in transverse section through the switch of the present invention, taken approximately on the staggered line 1—1 of Fig. 2.
Figure 2:
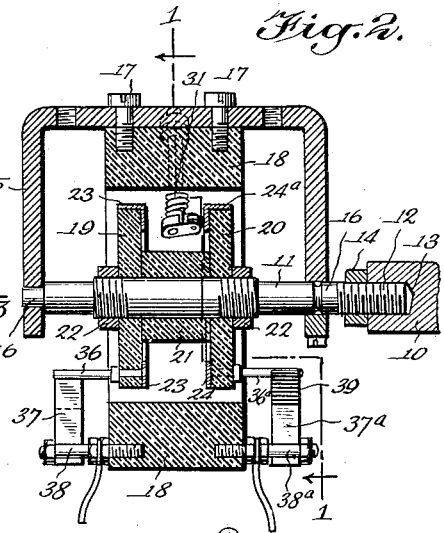
Fig. 2 is a longitudinal sectional view through the switch and its supporting means on the line 2—2 of Fig. 1.
Figure 3:
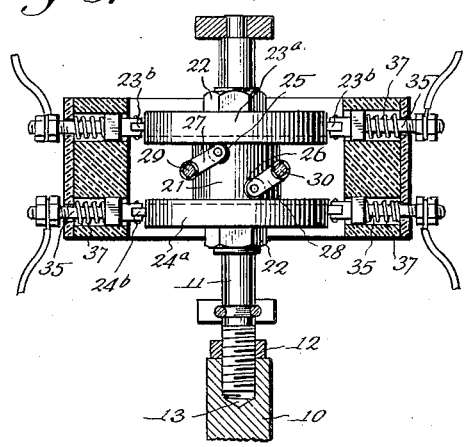
Fig. 3 is a sectional plan view on the line 3—3 of Fig. 1.
Figure 4:
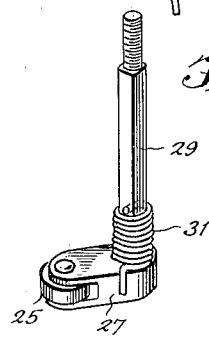
Fig. 4 is a perspective view of one of the contact elements.
Figure 5:
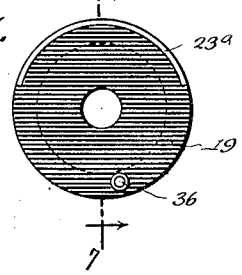
Fig. 5 is a plan view of one of the switch discs.
Figure 6:
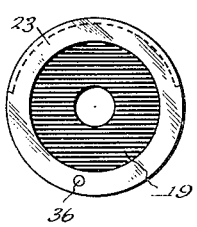
Fig. 6 is a similar view showing the reverse face of the disc.
Figure 7:
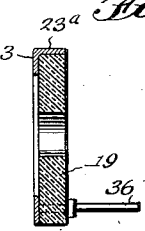
Fig. 7 is a sectional view on the line 7—7 of Fig. 5.
Figure 8:
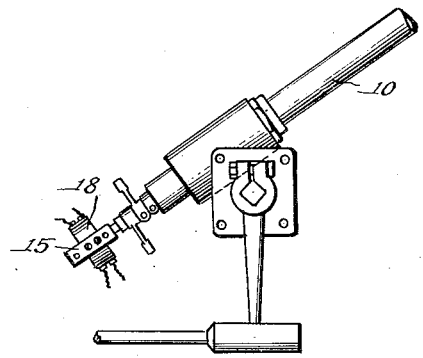
Fig. 8 is a somewhat diagrammatic side elevational view indicating the position of the switch relative to the steering post of the vehicle.
Figure 9:
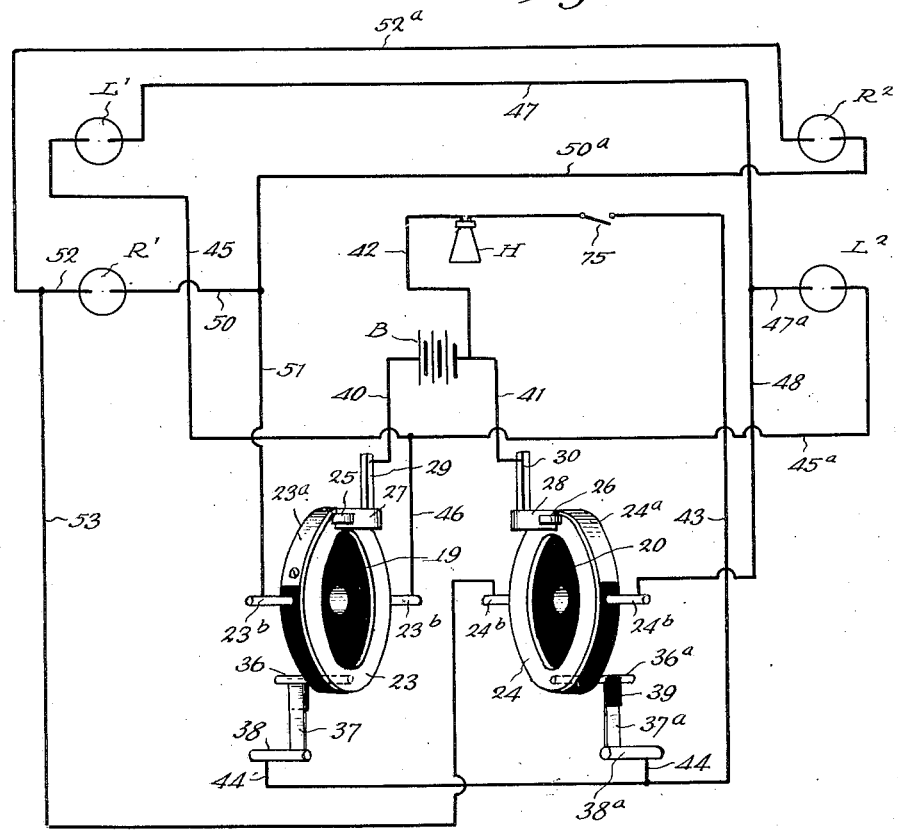
Fig. 9 is a wiring diagram.

In the drawings I have used the reference numeral 10 to designate the steering post of an automobile, to the lower end of which is secured a spindle 11. Preferably the threaded end 12 of the spindle is screwed into a suitable socket 13 in the lower end of the post 10 and retained in position by locking nut 14. Any suitable means such for instance as the yoke member 15 may serve to provide bearings at 16 for the spindle.

Secured by screws or other suitable securing devices 17 to the yoke 15 is the outer annular member 18 of the switch of the present invention. The member 18 preferably of insulating material is concentric with the inner member of the switch, the latter being rotatable and carried on the spindle 11. The inner switch member may conveniently include a pair of discs 19 and 20 of insulating material held in spaced relationship by a hub 21 and compelled to turn with the shaft by nuts 22 clamping them against the end faces of the hub. The members 19 and 20 include annular rings 23 and 24 respectively clamped against their inner faces. The rings 23 and 24 are formed with laterally extending arcuate lips 23$^a$ and 24$^a$ overlying the periphery of the discs. The rings 23 and 24 are permanently in contact with contact rollers 25 and 26 respectively. These rollers are mounted in the ends of arms 27 and 28 carried by binding posts 29 and 30 mounted in the outer member 18 of the switch. The arms 27 and 28 are urged by springs 31 into firm electrical contact with the rings 23 and 24. It will thus be apparent that rotation of the switch discs 19 and 20 does not affect the contact between the rings 23, 24 and the rollers 25, 26.

The lips 23$^a$ and 24$^a$ preferably extend less than half the distance around the peripheries of the discs, so that they are normally out of contact with sets of associated rollers 23$^b$ and 24$^b$. Both sets of rollers are the same, and for convenience the rollers 23$^b$ may be described. These rollers are carried by the ends of binding posts 35 accommodated in diametrically opposed pockets 36 in outer member 18. Springs 37 urge the binding posts radially inwardly and hold the rollers against the periphery of the disc. Normally, the rollers bear against the insulating material of the disc body, but upon rotation of the disc 20 either to the right or left to a predetermined extent, determined by the length of the lip 23$^a$, one or the other of the rollers will establish an electrical contact through the lip, and thus place one of the binding posts 35 in an electrical circuit with the binding post 29.

The disc 19 carries a laterally projecting pin 36 adapted when the disc is rotated to the right to make contact with a spring contact finger 37 carried by a binding post 38 secured to the outer switch member 18. A similar finger 37$^a$ carried by binding post 38$^a$ is adapted to contact with a pin 36$^a$ carried by the disc 20. It will be noted that the fingers 37 and 37$^a$ are each faced on one side with insulating material 39 so that the pin 37 or 37$^a$ as the case may be, will make contact as it moves past its associated finger in one direction and will fail to make contact as it returns over the insulated face of the finger.

Before describing the operation of the switch mechanism and the particular signal circuit with which it has been shown as associated, it is to be understood that the particular location in which the switch mechanism is mounted and the particular manner in which it is used, is subject to a wide range of variation.

Referring now to the wiring diagram, it will be seen that I have used the reference characters L$^1$ and L$^2$ to designate a pair of signal lights for indicating left turns and the reference characters R$^1$ and R$^2$ to designate signal lights for indicating right turns. The vehicle horn is indicated at H and the device is so arranged that when the wheel is swung either to the right or to the left, the two right signal lights, or the two left signal lights, as the case may be, will be lit, and the horn will be sounded.

A battery which may represent the ordinary storage battery of a vehicle is shown at B and is connected by lead wires 40, 41 to the binding posts 29 and 30 respectively. From the battery B, a conductor 42 runs to the horn H, the horn being also connected by a lead 43, branch leads 44 to the two binding posts 38, 38$^a$ which in turn connect through the pins 36 and 36$^a$ and rings 23 and 24, to the binding posts 29, 30 at the battery. Thus, every time the wheel of the car is shifted sufficiently to bring either of the pins 36 or 36$^a$ into contact with its associated finger 37 or 37$^a$, a circuit will be closed through the horn and the horn will be sounded. When a turn is being made either to the right or to the left, the pin 36 or 36$^a$ will quickly snap past its associated contact finger 37 or 37$^a$ so that the sounding of the horn will be but temporary. The horn will not sound as the car is straightened out and the pins ride over the insulated faces 39 of their associated fingers.

Lead wires 45, 45$^a$ from the lamps L$^1$ and L$^2$ connect with a branch lead 46 which joins one of the binding posts connected to one of the rollers 23$^b$. The other side of the lamps L$^1$ and L$^2$ are connected through leads 47 and 47$^a$ to a common conductor 48 which joins one of the binding posts connected to one of the rollers 24$^b$. Thus, as the wheel is swung to the left, the rollers 23$^b$ and 24$^b$ which are in circuit with the left signal lamps L$^1$ and L$^2$ ride over the lips 23$^a$ and 24$^a$ and close a circuit through the signal lamps, this circuit being completed through the battery by the leads 40 and 41. The arrangement for operating the right hand signal lamps R$^1$ and R$^2$ are exactly the same. It will be noted that both of these lamps are connected by leads 50, 50$^a$ respectively to a common conductor 53 which joins the binding post of the other roller 24$^b$.

From the foregoing description it will be apparent that both signal lamps are operated and the horn sounded whenever the wheel is swung any material distance to either the right or the left. The signal lamps will remain on until the wheel is again straightened out, while the sounding of the horn will be but temporary. In order to avoid the inconvenience of sounding the horn while jockeying the car about in a garage, I provide a separate switch 75 in the horn circuit for optionally cutting out the horn entirely.

Obviously, various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. In a device of the class described, a rotary member of an insulating material, a circular contact member on an end face of said member, a contact strip on a portion of the peripheral edge of said member and in electrical connection with said circular contact, a fixed contact member disposed in wiping relation to said circular contact, a pair of fixed contact members spaced about the peripheral edge of said rotary member and disposed in wiping relation therewith, the latter contacts being adapted to be contacted by the contact strip on the periphery of said rotary member in the reversed rotative movements thereof, another fixed contact at one side of said rotary member, and a contact member carried by said rotary member in electrical connection with said circular contact thereon and adapted to momentarily contact said last-mentioned fixed contact during the rotative movements of the rotary member as aforesaid.

2. In a device of the class described, a rotary member of an insulating material, an annular contact member on an end face of said rotary member, a contact strip on a portion of the peripheral edge of said rotary member and in electrical connection with said annular contact, a fixed contact member disposed in wiping relation to said annular contact, a pair of fixed contact members spaced about the peripheral edge of said rotary member and in rolling relation therewith, the latter contact members being adapted to be contacted by the contact strip on the periphery of said rotary member in the reversed rotative movements thereof, a fixed resilient contact at one side of said rotary member, and a contact member carried by said rotary member in electrical connection with said annular contact thereon and adapted to momentarily contact said last-mentioned fixed contact member during the rotative movements of the rotary member as aforesaid.

3. In a device of the class described, a circular rotary member of an insulating material, a fixed member also of an insulating material enclosing the peripheral edge portion of said rotary member, an annular contact member on one end face of said rotary member, a contact strip on a portion of the peripheral edge of said rotary member and in electrical connection with said annular contact member, a fixed contact carried by said fixed member and disposed in rolling relation with said annular contact member, a pair of fixed contact members spaced about said fixed insulating member and disposed in rolling relation with the peripheral edge of said rotary member, the latter contact members being adapted to be contacted by the contact strip on the peripheral edge of said rotary member in the reversed rotative movements thereof, a fixed resilient contact member also carried by said fixed insulating member and disposed at one side of said rotary member, and a contact pin carried by said rotary member in electrical connection with the said annular contact member and adapted to momentarily contact said last-mentioned fixed contact member during the rotative movements of the rotary member as aforesaid.

4. In a device of the class described, a pair of spaced rotary circular members of an insulating material, a fixed member also of an insulating material enclosing the peripheral edge portions of said rotary members, an annular contact member on the opposed end faces of said rotary members, a contact strip on a portion of the peripheral edges of each of said rotary members and disposed in electrical connection with the said annular contact members thereon, a pair of fixed contact members carried by said fixed insulating member, one disposed in rolling relation with each of the annular contact members, pairs of fixed contact members also carried by said fixed insulating member in spaced relation with one pair disposed in rolling contact with the peripheral edge portions of each of said rotary members, each pair of the latter contact members being adapted to be contacted by the peripheral contact strips of the rotary members complemental thereto during the reversed rotative movements thereof, a pair of fixed resilient contact members also carried by said fixed insulating member, one disposed at the outer side of each of said rotary members, and a contact pin carried by each of said rotary members in electrical connection with the said annular contact members thereon and adapted to momentarily contact said resilient contact members during the rotative movements of the rotary members as aforesaid.

HONORINO PEREIRA.